(No Model.)
G. H. BABCOCK & L. PINE.
WATER HEATER AND PURIFIER.
No. 314,414. Patented Mar. 24, 1885.
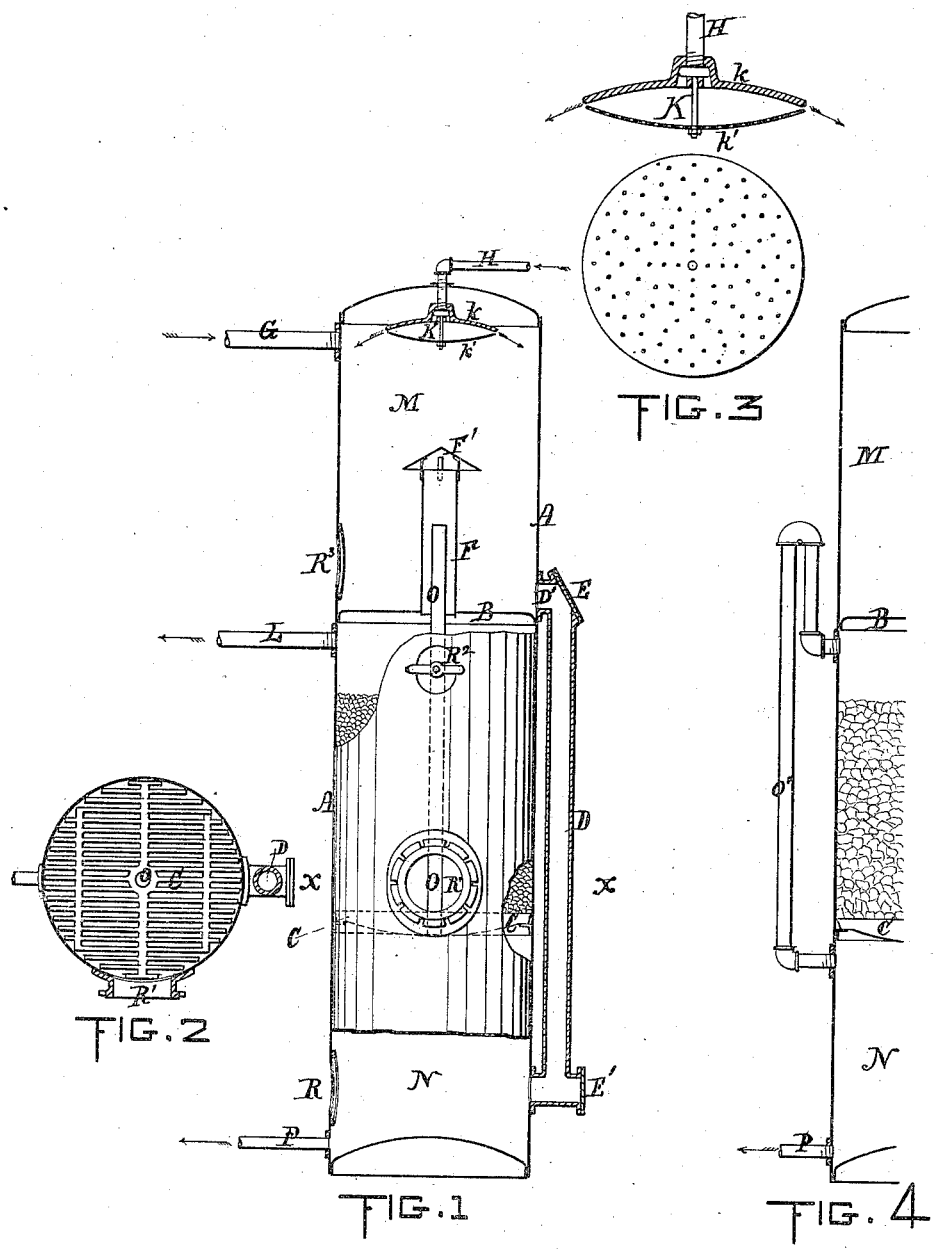
WITNESSES.
INVENTOR.
George H Babcock
Leighton Pine
by their attorney
Sydney A. Bennett

UNITED STATES PATENT OFFICE.

GEORGE H. BABCOCK, OF PLAINFIELD, NEW JERSEY, AND LEIGHTON PINE, OF SOUTH BEND, INDIANA, ASSIGNORS TO THE BABCOCK & WILCOX COMPANY, OF NEW JERSEY.

WATER HEATER AND PURIFIER.

SPECIFICATION forming part of Letters Patent No. 314,414, dated March 24, 1885.

Application filed May 29, 1884. (No model.)

*To all whom it may concern:*

Be it known that we, GEORGE H. BABCOCK, of the city of Plainfield, county of Union, and State of New Jersey, and LEIGHTON PINE, of the city of South Bend, and State of Indiana, have invented certain new and useful Improvements in Water Heaters or Purifiers; and we do hereby declare that the following is a full, clear, and accurate description and specification thereof, reference being had to the accompanying drawings, in which—

Figure 1 is a partial elevation and partial vertical section. Fig. 2 is a horizontal section through the line X X, Fig. 1. Fig. 3 shows the spray-box enlarged, and Fig. 4 is a partial vertical section showing a modification in construction.

Our invention is based on the well-known action of a high temperature to cause a deposit of the impurities in water; and it consists in an improved construction, combination, and arrangement of parts in a device in which the water to be purified is caused to fall in a finely-divided condition through an atmosphere of steam, whence it is carried to the lower portion of a settling-chamber wherein the impurities are permitted to settle, and thence gradually rising through a filtering medium is delivered purified from the greater portion of all the salts or impurities which it contains.

In all heaters of this general class heretofore known the connection between the spray-chamber and the settling-chamber has been by passages in the interior of the heater, and much difficulty has been experienced in consequence of these passages becoming clogged by the deposit therein of salts and other impurities from the water, access to said passages being either practically impossible or very difficult, and their proper cleaning a matter of much trouble and time.

One important feature of our invention consists in an external communication between the spray-chamber and the settling-chamber, which external passage is so constructed that ready access may be had thereto, and every part thereof may be easily cleaned from sediment.

Another important element of our invention consists in a connection between the spray-chamber and the top of the settling-chamber by means of a pipe, which is protected by a hood or cap from the spray, whereby the pressure between the spray-chamber and the settling-chamber is equalized, and at the same time the water is prevented from passing from the spray-chamber to the settling-chamber, except through the external pipe heretofore mentioned.

Another important element in our invention consists, in connection with the settling-chamber and a filter therein, of a safety-pipe passing through or around said filter to a point at a distance above the outlet-pipe from said chamber, so that if the filter should become so clogged as to prevent a reasonable pressure forcing the water through it, a passage may be had from the settling-chamber around or through the filter to the delivery-pipe, and the boiler still receive its proper supply.

Another element of our invention consists in the construction of the spray-box with an elastic side so that should the perforations therein become stopped by a collection of sediment the pressure of the feed-water will open the joints of the spray-box and admit of its continued use, even when badly fouled.

We prefer to construct our improved heater and purifier as follows:

A is a shell, of boiler-iron or other suitable material, capable of withstanding the pressure of steam which is used for heating the water. The steam may be derived directly from the steam-space of the boiler, or it may be steam which has performed some other function, as driving an engine, heating, or otherwise, previous to its use herein. For the more perfect carrying out, however, of the objects of our invention it is better that the temperature of this steam should be as high as 300°, if possible.

The shell A is divided horizontally by a tight partition, B, into two compartments, M and N. At a distance from the bottom of the compartment M we support a grate, C. A pipe, D, external to the shell A, connects the bottom of the pump-compartment M with the bottom or a point near the bottom of compartment N. This pipe D is provided at its upper end with a beveled flange, E, which, when removed, permits of access to both the vertical portion D and the upper elbow, D', for cleaning. A bonnet, E', is also provided at the bottom of the pipe D for cleaning the lower elbow.

A tube, F, is fixed in the partition B, extending some distance upward into the compartment M, and is provided at its top with a hood, F', which prevents the water as it falls from the spray-box gaining access to the interior of the pipe F; but permits of free passage of the steam in the compartment M to the top of the compartment N, so that an equal pressure must exist in both. A steam-pipe, G, brings steam from any suitable vessel to the interior of the compartment M.

A feed-pipe, H, connected with pumps or other suitable means of supplying water, enters the upper head of the compartment M, to the end of which pipe is attached a spray-box, K. This spray-box is shown on a larger scale in Fig. 3, and consists of a casting, $k$, preferably circular, screwed to the end of the pipe H.

$k'$ is a dished plate of thin metal perforated with a large number of small holes, bolted up to the casting $k$ by a central bolt, as shown. When so bolted, the edges of the casting $k$ and the flexible plate $k'$ come in contact, making a box tight with the exception of the perforations in $k'$.

We have found in practice that any apparatus spraying water into a steam-compartment quickly becomes fouled by deposit and the perforations therein become stopped, requiring frequent cleaning. The construction of our spray-box admits of easy cleaning by the removal of the plate $k'$, when all of the interior is readily accessible; but by the construction of this box K with the flexible plate $k'$ should the perforations therein become stopped so as to prevent the flowing of the water, the pressure of the water will spring the flexible plate $k'$ and open the joint between it and the casting $k$, causing the water to be delivered in a thin sheet all around the edge of the box, in a manner very nearly as effective as if delivered through the perforations in $k'$. By this construction we are enabled to secure the continuous proper action of the spray-box longer than is found possible with the constructions hitherto known.

L is the pipe communicating with the upper end of the chamber N for the delivery of the water after it has been heated and purified. The space above the grating C in the compartment N is partly filled with coke, charcoal, or other proper material, for filtering the water on its upward passage to the delivery-pipe L. In order that the clogging of this filter may not prevent the continuous action of the heater and purifier, we provide a pipe, O, extending from below the grate C through the filter to a point above the delivery-pipe L. In the drawings this is shown extending up into the pipe F, by which means we are enabled to save room in the height of the chamber N. The distance which the pipe O extends above the delivery-pipe L determines the pressure allowed for the resistance of the filter, and when that pressure is exceeded the water will flow through the pipe O directly without passing through the filter.

P is a blow-off pipe, which may be fitted with a valve in the ordinary manner, for blowing off the sediment which collects in the bottom of the compartment N.

Man-holes R, R', $R^2$, and $R^3$ permit access to the different portions of the interior for the purposes of cleaning as well as for removing and replacing the filtering material.

The operation of our heater and purifier is as follows: Steam being admitted through the pipe G to the interior of the compartment M flows through the hooded pipe F into the compartment N until the same steam-pressure obtains in both. Water is then forced through the pipe H into the spray-box K, and falling in fine spray through the steam in the compartment M is thereby heated to the full temperature of such steam, and then flows through the external pipe, D' D, into the lower portion of the compartment N, which is of such capacity that the impurities contained in the water are allowed to settle to the bottom, while the water flows gradually upward to and through the filter, which removes such impurities as do not settle, and thence outward through the discharge-pipe L to the boiler or wheresoever it is to be used. The impurities in the water are liable to deposit very early after it is heated by the steam in the spray chamber or compartment M, and the bottom of such spray-chamber and the pipe D are liable very soon to become coated and require cleaning. This is readily accomplished by means of the bonnets E E' without necessitating entering the compartment M through the man-hole $R^3$. The sediment which enters the bottom of the settling chamber or compartment N may be blown out through the blow-off pipe P, or if too solid to be thus readily removed can be taken out through the man-hole R.

In course of time the impurities in the water will be liable to clog the interstices in the filter, in which case the pressure required to force the water through the filter will be gradually increased, causing the water to accumulate in the compartment M. When this pressure increases to such an extent that the water in the compartment M rises to the top of the pipe O, the water will then flow upward through the pipe O from below the grate C to the delivery-pipe L, and thus water which has had time to settle its main impurities in the compartment N without going through the filter will be delivered without interfering with the working of the heater. As the hooded pipe F extends higher into the compartment M than the top of the pipe O, it will be seen that the freshly-heated water coming into the compartment M can never reach the delivery-pipe L, except through the external pipe, D, and the compartment N, until the pipe D becomes closed by sediment, in which case the water will rise in M until it flows down the equalizing-pipe F, and thence to the boiler. A modification of this pipe O' is shown in Fig. 4, wherein it is external to the shell A, returning upon itself at its highest point and re-entering the compartment N at the upper end thereof. The effect of this pipe is similar to the pipe O' in Fig. 1. When the pressure below the filter is greater than the pressure above the filter, the water will rise, and if the pressure be sufficient it will rise to the bend and overflow. This arrangement will, moreover, have the advantage that immediately after the current is started the water in the short leg of this external pipe, O', will counterbalance the same length in the longer leg, and the water will flow over until all the accumulation in the compartment M will disappear; in other words, the pipe O', after the water has started to flow through it, becomes a partial siphon, and is in effect only equal in length to the distance between its ends, and it will require no more pressure to pass the water through this pipe after it has once started than it would if it were that much shorter.

An important advantage of our invention is in the security that the feed to the boiler, when the apparatus is used for that purpose, will not be interrupted from neglect of the proper attention to the heater, as is the case in all heaters and purifiers heretofore made. Should the spray-box become filled, it opens and acts as a spray-valve or overflow-pan. Should the filter become stopped by sediment, the water will flow around it by the self-acting pipe O or O'; and should the pipe D become stopped, or both the filter and the pipe O, then the water will rise in the spray-chamber until it overflows the hooded pipe F, and so flows direct to the boiler.

By placing gage-cocks or gage-glasses at various points in the shell, the condition of the heater can be ascertained without stopping its action by ascertaining the position of the water-level.

What we claim as our invention, and desire to secure by Letters Patent, is—

1. In a feed-water heater and purifier, a spray-chamber and a settling-chamber connected by an external pipe having removable portions or bonnets, whereby the interior of said pipe is rendered accessible for cleaning, substantially as specified.

2. In a feed-water heater and purifier having a spray-chamber and a settling-chamber, a hooded equalizing-pipe connecting the same, substantially as specified.

3. In a feed-water heater and purifier having a spray-chamber and a settling-chamber, an external pipe accessible for cleaning and an equalizing-pipe connecting the said chambers, substantially as specified.

4. In a feed-water heater and purifier, the combination of a settling-chamber and a filter with a pass-over pipe around or through the filter, substantially as specified.

5. In a feed-water heater and purifier, a perforated elastic spray-box, substantially as specified.

6. In a feed-water heater and purifier having a filter and settling-chamber, a siphon pass-over pipe, substantially as and for the purpose specified.

7. In a feed-water heater and purifier having a spray-chamber and a settling-chamber connected by an external pipe, a diagonal cap permitting access to two parts of said pipe through one opening, substantially as specified.

GEO. H. BABCOCK.
LEIGHTON PINE.

Witnesses:
CHAS. ELKIN,
JNO. SCOTT,
F. P. CARMANY,
JOHN W. H. BEANS.